United States Patent
Ishikawa et al.

(10) Patent No.: US 11,036,235 B2
(45) Date of Patent: Jun. 15, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Makoto Ishikawa, Wako (JP); Hiroshi Miura, Wako (JP); Masamitsu Tsuchiya, Wako (JP); Koji Kawabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 72 days.

(21) Appl. No.: 16/210,254

(22) Filed: Dec. 5, 2018

(65) Prior Publication Data

US 2019/0196486 A1 Jun. 27, 2019

(30) Foreign Application Priority Data

Dec. 21, 2017 (JP) .............................. JP2017-245547

(51) Int. Cl.
*B60W 40/09* (2012.01)
*G05D 1/02* (2020.01)
(Continued)

(52) U.S. Cl.
CPC ..... *G05D 1/0223* (2013.01); *B60W 30/18163* (2013.01); *B60W 40/09* (2013.01);
(Continued)

(58) Field of Classification Search
CPC .. G05D 1/0223; G05D 1/0287; G05D 1/0088; G05D 2201/0213; G06K 9/00825;
(Continued)

(56) References Cited

U.S. PATENT DOCUMENTS

2017/0329332 A1* 11/2017 Pilarski ............ B60W 30/0956
2018/0330174 A1* 11/2018 Pratt ..................... G01S 13/931

FOREIGN PATENT DOCUMENTS

JP 2005-532747 10/2005
JP 2006-256493 9/2006
(Continued)

OTHER PUBLICATIONS

English_Translation_JPWO2015186648A1 (Year: 2015).*
(Continued)

*Primary Examiner* — Peter D Nolan
*Assistant Examiner* — Ashley L Redhead, Jr.
(74) *Attorney, Agent, or Firm* — Amin, Turocy & Watson, LLP

(57) ABSTRACT

A vehicle control device including a first recognizer recognizing one or more other vehicles present in the vicinity of a subject vehicle; a second recognizer recognizing that a road on which the subject vehicle is running is a road having no center line; an estimator estimating a state of a driver of an oncoming vehicle facing the subject vehicle among the one or more other vehicles recognized by the first recognizer; a determiner determining whether the oncoming vehicle is a vehicle executing manual driving; and a controller decelerating the subject vehicle to a speed equal to or lower than a predetermined speed on the basis of the state of the driver of the oncoming vehicle in a case in which the oncoming vehicle is a vehicle executing manual driving, and the road on which the subject vehicle is running is a road having no center line.

4 Claims, 10 Drawing Sheets

(51) Int. Cl.
  *G06K 9/00* (2006.01)
  *B60W 30/18* (2012.01)
  *G05D 1/00* (2006.01)
(52) U.S. Cl.
  CPC ......... *G05D 1/0088* (2013.01); *G05D 1/0287* (2013.01); *G06K 9/00798* (2013.01); *G06K 9/00825* (2013.01); *G05D 2201/0213* (2013.01)
(58) Field of Classification Search
  CPC .......... G06K 9/00798; G06K 9/00845; B60W 30/18163; B60W 40/09; B60W 2554/4047; B60W 2554/4046; B60W 2552/05; B60W 2556/65; B60W 2552/00; B60W 30/143; B60W 30/09; B60W 40/04; B60W 40/08
  See application file for complete search history.

(56) References Cited

FOREIGN PATENT DOCUMENTS

| | | | | |
|---|---|---|---|---|
| JP | 2008-174023 | | 7/2008 | |
| JP | 2015-044432 | | 3/2015 | |
| JP | 2015044432 | A * | 3/2015 | |
| JP | WO2015186648 | A1 * | 4/2017 | ............ B60W 40/00 |
| JP | WO2016002276 | A1 * | 4/2017 | ......... G06K 9/00818 |
| WO | 2016/002276 | | 1/2016 | |

OTHER PUBLICATIONS

English_Translation_JPWO2016002276A1 (Year: 2016).*
English_Translation_JP2015044432A (Year: 2015).*
Japanese Office Action for Japanese Patent Application No. 2017-245547 dated Jun. 25, 2019.

* cited by examiner

VEHICLE CONTROL DEVICE, VEHICLE CONTROL METHOD, AND STORAGE MEDIUM

This application is based upon and claims the benefit of priority from Japanese Patent Application No. 2017-245547, filed Dec. 21, 2017, the entire contents of which are incorporated herein by reference.

BACKGROUND

Field of the Invention

The present invention relates to a vehicle control device, a vehicle control method, and a storage medium.

Description of Related Art

In recent years, automated driving has been researched. In relation to this, in a case in which there is a possibility of a collision between a subject vehicle and another vehicle such as an oncoming vehicle, technologies for executing driving support control such that the subject vehicle does not collide with another vehicle are known (for example, see Japanese Unexamined Patent Application Publication No. 2006-256493).

SUMMARY

However, in a conventional technology, in a case in which a subject vehicle encounters an oncoming vehicle when the subject vehicle is driven under automated driving, there are cases in which the subject vehicle moves forward while the subject vehicle passes the oncoming vehicle without change. As a result, there is concern that a vehicle occupant of the oncoming vehicle may experience fear or an unpleasant feeling, and there are cases in which there is not sufficient consideration of the oncoming vehicle.

An aspect of the present invention is realized in consideration of such situations, and one object thereof is to provide a vehicle control device, a vehicle control method, and a storage medium capable of executing vehicle control in consideration of an oncoming vehicle in a case in which a subject vehicle and the oncoming vehicle pass each other.

A vehicle control device, a vehicle control method, and a storage medium according to the present invention employ the following configurations.

According to one aspect (1) of the present invention, a vehicle control device is provided, including: a first recognizer recognizing one or more other vehicles present in the vicinity of a subject vehicle; a second recognizer recognizing that a road on which the subject vehicle is running is a road having no center line; an estimator estimating a state of a driver of an oncoming vehicle facing the subject vehicle among the one or more other vehicles recognized by the first recognizer; a determiner determining whether the oncoming vehicle recognized by the first recognizer is a vehicle executing manual driving; and a controller decelerating the subject vehicle to a speed equal to or lower than a predetermined speed on the basis of the state of the driver of the oncoming vehicle estimated by the estimator in a case in which the oncoming vehicle is determined to be a vehicle executing manual driving by the determiner, and the road on which the subject vehicle is running is recognized as a road having no center line by the second recognizer.

According to an aspect (2), in the vehicle control device according to the aspect (1), a communicator communicating with the other vehicles is further included, the communicator communicates with the oncoming vehicle in a case in which the subject vehicle passes the oncoming vehicle without change on a road having no center line, and the determiner determines whether or not the oncoming vehicle recognized by the first recognizer is a vehicle executing manual driving on the basis of at least a result of the communication between the communicator and the oncoming vehicle.

According to an aspect (3), in the vehicle control device according to the aspect (1) or (2), the controller maintains the state in which the subject vehicle is decelerated to a speed equal to or lower than the predetermined speed at a place at which a width of a road is larger than at least a sum of vehicle widths of the subject vehicle and the oncoming vehicle.

According to an aspect (4), in the vehicle control device according to any one of the aspects (1) to (3), the first recognizer further recognizes a speed of the oncoming vehicle, and the controller does not decelerate the subject vehicle to a speed equal to or lower than a predetermined speed in a case in which the oncoming vehicle is determined to be a vehicle executing manual driving by the determiner, and the speed of the oncoming vehicle recognized by the first recognizer is equal to or lower than a predetermined speed.

According to another aspect (5) of the present invention, a vehicle control method is provided causing an in-vehicle computer to execute: recognizing one or more other vehicles present in the vicinity of a subject vehicle; recognizing that a road on which the subject vehicle is running is a road having no center line; estimating a state of a driver of an oncoming vehicle facing the subject vehicle among the recognized one or more other vehicles; determining whether the recognized oncoming vehicle is a vehicle executing manual driving; and decelerating the subject vehicle to a speed equal to or lower than a predetermined speed on the basis of the estimated state of the driver of the oncoming vehicle in a case in which the oncoming vehicle is determined to be a vehicle executing manual driving, and the road on which the subject vehicle is running is recognized as a road having no center line.

According to another aspect (6) of the present invention, a computer-readable non-transitory storage medium is provided having a program stored thereon, the program causing an in-vehicle computer to execute: a process of recognizing one or more other vehicles present in the vicinity of a subject vehicle; a process of recognizing that a road on which the subject vehicle is running is a road having no center line; a process of estimating a state of a driver of an oncoming vehicle facing the subject vehicle among the recognized one or more other vehicles; a process of determining whether the recognized oncoming vehicle is a vehicle executing manual driving; and a process of decelerating the subject vehicle to a speed equal to or lower than a predetermined speed on the basis of the estimated state of the driver of the oncoming vehicle in a case in which the oncoming vehicle is determined to be a vehicle executing manual driving, and the road on which the subject vehicle is running is recognized as a road having no center line.

According to any one of the aspects (1) to (6), in a case in which a subject vehicle and an oncoming vehicle pass each other, vehicle control in consideration of the oncoming vehicle can be executed.

DESCRIPTION OF EMBODIMENTS

Hereinafter, a vehicle control device, a vehicle control method, and a storage medium according to embodiments of the present invention will be described with reference to the drawings. In the following embodiments, the vehicle control device will be described as being applied to a vehicle capable of performing automated driving (autonomous driving). Automated driving, for example, is an aspect of causing a vehicle to run by controlling one or both of steering and acceleration/deceleration of the vehicle independently of an operation of a vehicle occupant of the vehicle. In this automated driving, driving support such as adaptive cruise control (ACC) or lane keeping assist (LKAS) may be included.

[Entire Configuration]

Figure 1:
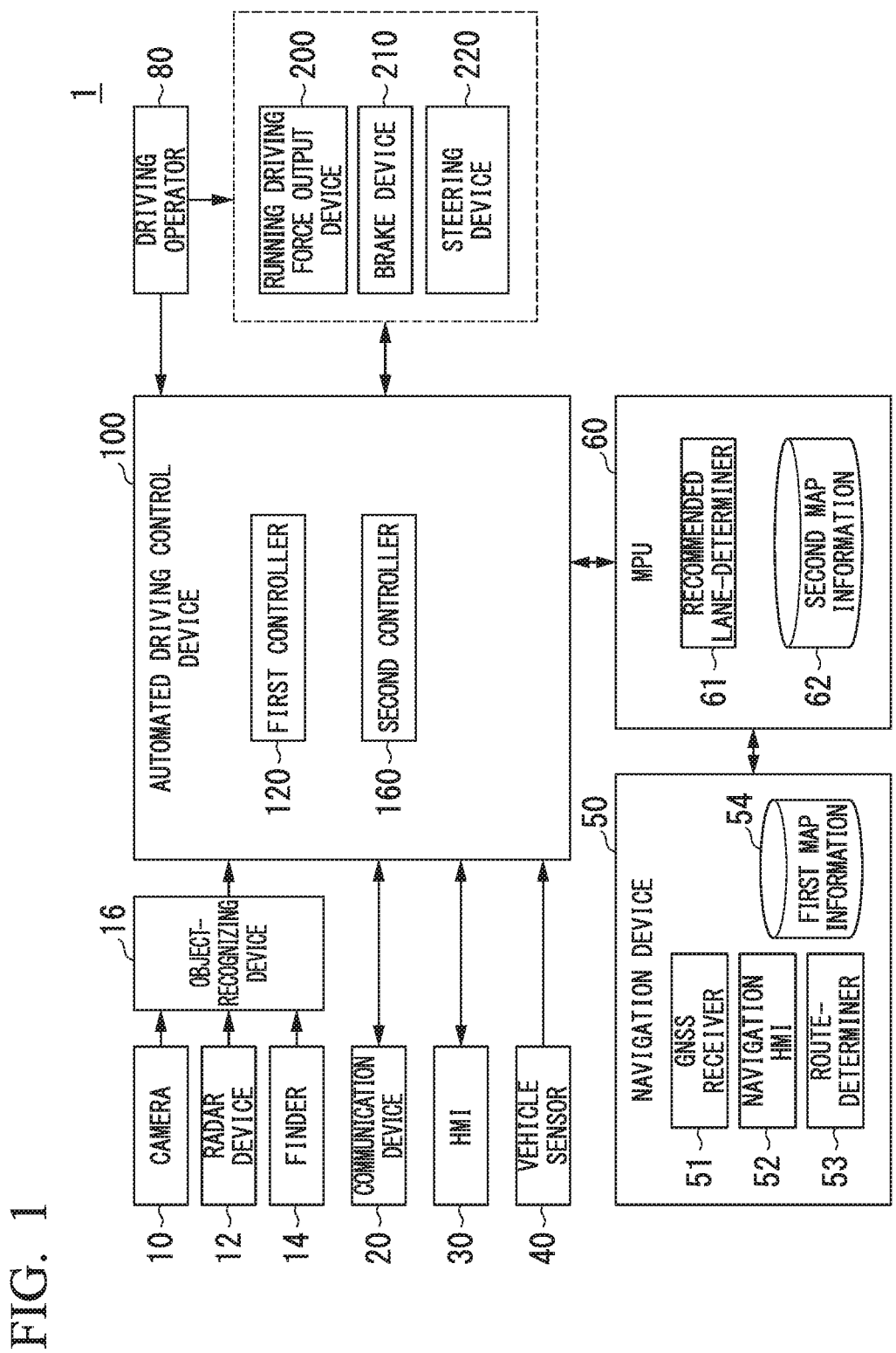
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted (hereinafter referred to as a subject vehicle M) is, for example, a vehicle having two wheels, three wheels, four wheels, or the like, and a driving source thereof is an internal combustion engine such as a diesel engine or a gasoline engine, an electric motor, or a combination thereof. In a case in which an electric motor is included, the electric motor operates using power generated using a power generator connected to an internal combustion engine or discharge power of a secondary cell or a fuel cell.

The vehicle system 1, for example, includes a camera 10, a radar device 12, a finder 14, an object-recognizing device 16, a communication device 20, a human machine interface (HMI) 30, a vehicle sensor 40, a navigation device 50, a map-positioning unit (MPU) 60, a driving operator 80, an automated driving control device 100, a running driving force output device 200, a brake device 210, and a steering device 220. These devices and units are interconnected using a multiplex communication line such as a controller area network (CAN) communication line, a serial communication line, a radio communication network, or the like. The configuration illustrated in FIG. 1 is merely one example, and parts of the configuration may be omitted or other components may be added.

The camera 10, for example, is a digital camera using a solid-state imaging device such as a charge-coupled device (CCD) or a complementary metal oxide semiconductor (CMOS). One or a plurality of cameras 10 are installed at arbitrary places on a vehicle in which the vehicle system 1 is mounted (hereinafter referred to as a subject vehicle M). In a case in which the area in front of the vehicle is to be imaged, the camera 10 is installed on an upper part of a front windshield, a rear face of a rearview mirror, or the like. The camera 10, for example, repeatedly images the vicinity of the subject vehicle M periodically. The camera 10 may be a stereo camera.

The radar device 12 emits radio waves such as millimeter waves to the vicinity of the subject vehicle M and detects at least a position of (a distance and an azimuth to) an object by detecting radio waves (reflected waves) reflected by the object. One or a plurality of radar devices 12 are installed at arbitrary places on the subject vehicle M. The radar device 12 may detect a position and a speed of an object using a frequency-modulated continuous wave (FM-CW) system.

The finder 14 is a light detection and ranging (LIDAR) device. The finder 14 emits light to the vicinity of the subject vehicle M and measures scattered light. The finder 14 detects a distance to a target on the basis of a time from light emission to light reception. The emitted light, for example, is pulse-form laser light. One or a plurality of finders 14 are mounted at arbitrary positions on the subject vehicle M.

The object-recognizing device 16 performs a sensor fusion process on results of detection using some or all of the camera 10, the radar device 12, and the finder 14, thereby allowing recognition of a position, a type, a speed, and the like of an object. The object-recognizing device 16 outputs a result of recognition to the automated driving control device 100. In addition, when necessary, the object-recognizing device 16 may output results of detection using the camera 10, the radar device 12, and the finder 14 to the automated driving control device 100 as they are.

The communication device 20, for example, communicates with other vehicles in the vicinity of the subject vehicle M using a cellular network, a Wi-Fi network, Bluetooth (registered trademark), dedicated short-range communication (DSRC), or the like or communicates with various server apparatuses through a radio base station. Another vehicle m, for example, similar to the subject vehicle M, may be either a vehicle performing automated driving or a vehicle performing manual driving, although there is no specific restriction. In manual driving, unlike the automated driving described above, the acceleration/deceleration and the steering of the subject vehicle M are controlled in accordance with an operation performed by a vehicle occupant on the driving operator 80. Hereinafter, a vehicle executing only manual driving will be referred to as "a manual-driving vehicle", and a vehicle executing any one of manual driving and automated driving will be referred to as "a vehicle capable of executing automated driving" in the description. The communication device 20 is one example of a "communicator".

The HMI 30 presents various types of information to an occupant of the subject vehicle M and receives an input operation performed by a vehicle occupant. The HMI 30 may include various display devices, a speaker, a buzzer, a touch panel, switches, keys, and the like.

The vehicle sensor 40 includes a vehicle speed sensor that detects a speed of the subject vehicle M, an acceleration sensor that detects an acceleration, a yaw rate sensor that detects an angular velocity around a vertical axis, an azimuth sensor that detects the azimuth of the subject vehicle M, and the like.

The navigation device 50, for example, includes a global navigation satellite system (GNSS) receiver 51, a navigation HMI 52, and a route-determiner 53 and stores first map information 54 in a storage device such as a hard disk drive (HDD) or a flash memory. The GNSS receiver 51 identifies a position of a subject vehicle M on the basis of signals received from GNSS satellites. The position of the subject vehicle M may be identified or supplemented by an inertial navigation system (INS) using an output of the vehicle sensor 40. The navigation HMI 52 includes a display device, a speaker, a touch panel, a key, and the like. A part or all of the navigation HMI 52 and the HMI 30 described above may be configured to be shared. The route-determiner 53, for example, determines a route to a destination input by a vehicle occupant using the navigation HMI 52 (hereinafter referred to as a route on a map) from a position of the subject vehicle M identified by the GNSS receiver 51 (or an input arbitrary position) by referring to the first map information 54. The first map information 54, for example, is information in which a road form is represented by respective links representing a road and respective nodes connected using the links. The first map information 54 may include a curvature of each road, point of interest (POI) information, and the like. The route on the map determined by the route-determiner 53 is output to the MPU 60. In addition, the navigation device 50 may perform route guidance using the navigation HMI 52 on the basis of a route on the map determined by the route-determiner 53. Furthermore, the navigation device 50, for example, may be realized by a function of a terminal device such as a smartphone or a tablet terminal held by a vehicle occupant. In addition, the navigation device 50 may transmit a current location and a destination to a navigation server through the communication device 20 and acquire a route on the map received from the navigation server as a reply.

The MPU 60, for example, functions as a recommended lane-determiner 61 and stores second map information 62 in a storage device (storage) such as an HDD or a flash memory. The recommended lane-determiner 61 divides a route provided from the navigation device 50 into a plurality of blocks (for example, divides the route into blocks of 100 [m] in the advancement direction of the vehicle) and determines a recommended lane for each block by referring to the second map information 62. The recommended lane-determiner 61 determines a lane numbered from the left side in which to run. In a case in which a branching place, a merging place, or the like is present in the route, the recommended lane-determiner 61 determines a recommended lane such that the subject vehicle M can follow a reasonable route for advancement to divergent destinations.

The second map information 62 is map information having higher accuracy than the first map information 54. The second map information 62, for example, includes information of the center of each lane, information of a boundary of lanes, or the like. In addition, road information, traffic regulation information, address information (an address and a postal code), facility information, telephone number information, and the like may be included in the second map information 62. The second map information 62 may be updated when necessary by accessing another device using the communication device 20.

The driving operator 80, for example, includes an acceleration pedal, a brake pedal, a shift lever, a steering wheel, a steering wheel variant, a joystick, and other operators. A sensor detecting the amount of an operation or the presence/absence of an operation is installed in the driving operator 80, and a result of the detection is output to the automated driving control device 100 or at least one or all of the running driving force output device 200, the brake device 210, and the steering device 220.

The automated driving control device 100, for example, includes a first controller 120, and a second controller 160. Constituent elements of the first controller 120 and second controller 160, for example, are realized by a processor such as a central processing unit (CPU) or a graphics-processing unit (GPU) executing a program (software). In addition, some or all of these constituent elements may be realized by hardware (a circuit unit; including circuitry) such as a large-scale integration (LSI), an application-specific integrated circuit (ASIC), or a field-programmable gate array (FPGA), or may be realized by software and hardware in cooperation. The program may be stored in a storage device such as a hard disk drive (HDD) or a flash memory in advance or may be stored in a storage medium such as a DVD or a CD-ROM that can be loaded or unloaded and installed in a storage device disposed inside the automated driving control device 100 by loading the storage medium into a drive device of the automated driving control device 100.

Figure 2:
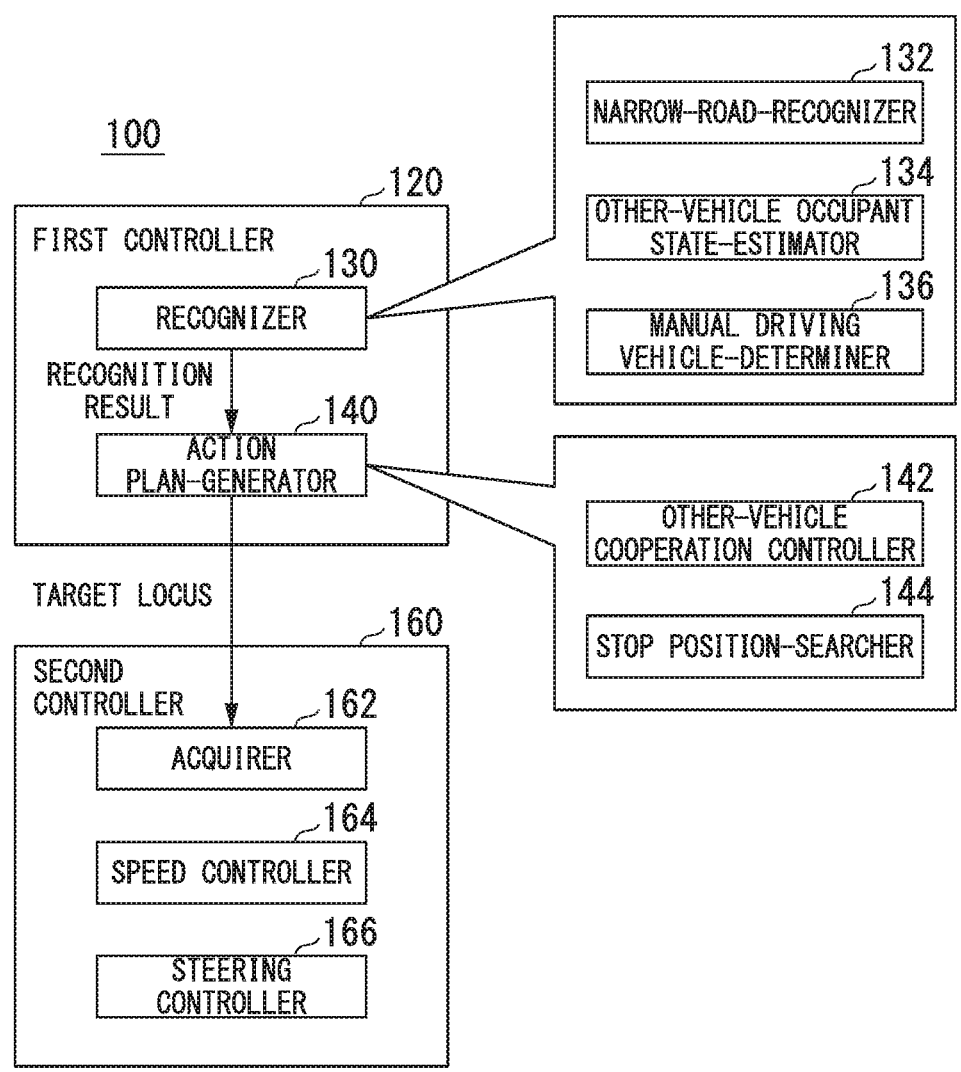
FIG. 2 is a functional configuration diagram of a first controller and a second controller.

FIG. 2 is a functional configuration diagram of the first controller 120 and the second controller 160. The first controller 120, for example, includes a recognizer 130 and an action plan-generator 140. The recognizer 130, for example, includes a narrow-road-recognizer 132, an other-vehicle occupant state-estimator 134, and a manual driving vehicle-determiner 136. In addition, the action plan-generator 140 includes an other-vehicle cooperation controller 142 and a stop position-searcher 144. The recognizer 130 is one example of a "first recognizer", and a combination of the action plan-generator 140 and the second controller 160 is one example of a "controller".

The first controller 120, for example, simultaneously realizes functions using artificial intelligence (AI) and functions using a model provided in advance. For example, a function of "recognizing an intersection" may be realized by executing recognition of an intersection using deep learning or the like and recognition based on conditions given in advance (a signal, road markings, and the like that can be used for pattern matching are present) at the same time and comprehensively evaluating both recognitions by assigning scores to them. Accordingly, the reliability of automated driving is secured.

The recognizer 130 recognizes states of a position, a speed, an acceleration, and the like of an object present in the vicinity of the subject vehicle M on the basis of information input from the camera 10, the radar device 12, and the finder 14 through the object-recognizing device 16. Among objects, other vehicles m, a stopped obstacle, and the like are included. The position of an object, for example, is recognized as a position on an absolute coordinate system having a representative point (the center of gravity, the center of a driving shaft, or the like) of the subject vehicle M as its origin and is used for control. The position of an object may be represented as a representative point such as the center of gravity or a corner of an object or may be represented as a representative area. A "state" of an object may include an acceleration, a jerk, or an "action state" (for example, whether or not the object is changing or is about to change lanes) of an object. In addition, the recognizer 130 recognizes the shape of a curve along which the subject vehicle M will pass next on the basis of a captured image captured by the camera 10. The recognizer 130 converts the shape of the curve from the captured image captured by the camera 10 into an actual plane and, for example, outputs two-dimensional point sequence information or information represented using a model equivalent thereto to the action plan-generator 140 as information representing the shape of the curve.

In addition, the recognizer 130, for example, recognizes a lane (running lane) in which the subject vehicle M is running. For example, the recognizer 130 may recognize a running lane by comparing a pattern of road partition lines acquired from the second map information 62 (for example, an array of solid lines and broken lines) with a pattern of road partition lines in the vicinity of the subject vehicle M that has been recognized from an image captured by the camera 10. In addition, the recognizer 130 is not limited to recognizing road partition lines and may recognize a running lane by recognizing running lane boundaries (road boundaries) including a road partition line, a road shoulder, curbstones, a median strip, a guardrail, and the like. In the recognition, the position of the subject vehicle M acquired from the navigation device 50 or a result of the process executed by an INS may be additionally taken into account. In addition, the recognizer 130 recognizes a road marking drawn on a road surface such as a temporary stop line, a road sign, an obstacle, a red signal, a tollgate, and other road events.

When a running lane is recognized, the recognizer 130 recognizes a position and a posture of the subject vehicle M with respect to the running lane. The recognizer 130, for example, may recognize a deviation of a reference point on the subject vehicle M from the center of the lane and an angle of the advancement direction of the subject vehicle M formed with respect to a line along the center of the lane as a relative position and a posture of the subject vehicle M with respect to the running lane. In addition, instead of this, the recognizer 130 may recognize a position of a reference point on the subject vehicle M with respect to a one side end part (a road partition line or a road boundary) of the running lane or the like as a relative position of the subject vehicle M with respect to the running lane.

In addition, in the recognition process described above, the recognizer 130 derives a recognition accuracy and outputs the derived recognition accuracy to the action plan-generator 140 as recognition accuracy information. For example, the recognizer 130 generates recognition accuracy information on the basis of a frequency at which a road partition line is recognized over a predetermined time period.

The narrow-road-recognizer 132 of the recognizer 130 recognizes whether a road on which the subject vehicle M runs is a narrow road. For example, the narrow-road-recognizer 132 determines whether or not a road on which the subject vehicle M runs has no center lane, and a width of the road is less than a predetermined width by referring to information of the number of lanes, the width, and the like included in the second map information 62 and recognizes that the road on which the subject vehicle M runs is a narrow road in a case in which the road has no center line, and the width of the road is less than the predetermined width. Here, the predetermined width is a width of a degree for which two vehicles cannot run in parallel with each other and, for example, is a width that is about 1.0 to 2.0 times a vehicle width of the subject vehicle M, an average width of popular vehicles, or a vehicle width that are set in advance as a specification of an ordinary car, a middle-sized car, or a large-sized car. In addition, in a case in which a running lane is recognized on the basis of an image captured by the camera 10, the narrow-road-recognizer 132 may recognize that a road on which the subject vehicle M is running is a narrow road on the basis of the number and the widths of running lanes that have been recognized. The narrow-road-recognizer 132 is one example of a "second recognizer".

In a case in which it is recognized that the road on which the subject vehicle M is running is a narrow road, the other-vehicle occupant state-estimator 134 of the recognizer 130 selects another vehicle m among one or more objects of which states such as speeds have been recognized and estimates a state of a vehicle occupant who is boarding on the selected another vehicle m.

Figure 3:
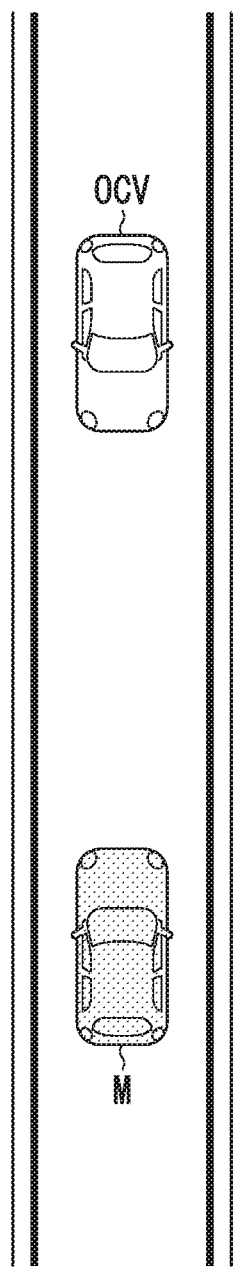
FIG. 3 is a diagram showing one example of a view in which a road on which a subject vehicle is running is a narrow road, and an oncoming vehicle is present in front of the subject vehicle.

FIG. 3 is a diagram showing one example of a view in which a road on which a subject vehicle M is running is a narrow road, and an oncoming vehicle OCV is present in front of the subject vehicle M. In such a case, for example, the other-vehicle occupant state-estimator 134, on the basis of a facial expression, an action, a posture, and the like of a driver of an oncoming vehicle OCV having a direction opposite to the advancement direction of the subject vehicle M as its advancement direction among other vehicles m present in its own lane (other vehicles m present in front/rear of the subject vehicle M) estimates a state of the driver.

The manual driving vehicle-determiner 136 of the recognizer 130 determines whether or not the oncoming vehicle OCV is running using manual driving. For example, the manual driving vehicle-determiner 136 determines whether or not the oncoming vehicle OCV is running using manual driving on the basis of establishment of inter-vehicle communication with the oncoming vehicle OCV, lighting/no-lighting of a lamp indicating execution of the manual driving among one or more lamps mounted in the oncoming vehicle OCV, and detection values detected by the radar device 12 and the finder 14 when the oncoming vehicle OCV is recognized.

The action plan-generator 140 determines events to be sequentially executed in automated driving such that the subject vehicle basically runs on a recommended lane determined by the recommended lane-determiner 61 and can respond to a surroundings status of the subject vehicle M. An event is information that defines a running mode of the subject vehicle M. As the events, for example, there are a constant-speed running event for running at a constant speed in the same running lane, a following running event of following a vehicle running ahead, an overtaking event of overtaking a vehicle running ahead, an avoidance event of performing braking and/or steering for avoiding approaching an obstacle object, a curved running event of running on a curve, a passage event of passing through a predetermined point such as an intersection, a crosswalk, or a railroad crossing, a lane-change event, a merging event, a branching event, an automatic stopping event, a takeover event for ending automated driving and switching to manual driving, and the like. Here, "following," for example, represents a mode in which the subject vehicle M runs with a relative distance (inter-vehicle distance) between the subject vehicle M and the preceding vehicle maintained to be constant.

The action plan-generator 140 generates a target locus along which the subject vehicle M will run in the future in accordance with operating events. The target locus, for example, includes a speed element. For example, the target locus is represented by sequentially aligning places (locus points) at which the subject vehicle M will arrive. When a route is delimited for every predetermined running distance (for example, about several [m]) measured along a road or the like, locus points are disposed at positions of the delimitations. Separate from the locus points, a target speed and a target acceleration for each of predetermined sampling times (for example, a fraction of a [sec]) are generated as a part of the target locus. In addition, a locus point may be a position at which the subject vehicle M will arrive at a sampling time for each predetermined sampling time. In such a case, information of a target speed or a target acceleration is represented using intervals between the locus points.

Figure 4:
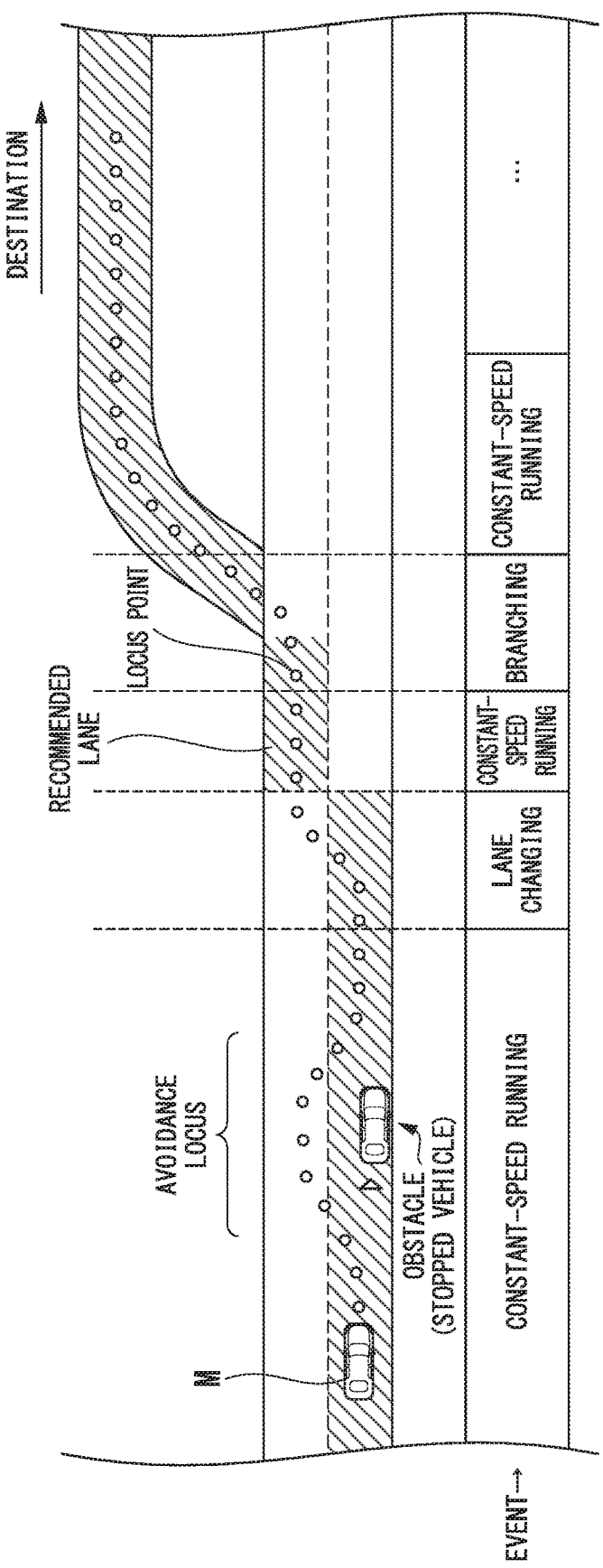
FIG. 4 is a diagram showing a view in which a target locus is generated on the basis of a recommended lane.

FIG. 4 is a diagram showing a view in which a target locus is generated on the basis of recommended lanes. As illustrated in the drawing, the recommended lanes are set such that surroundings are convenient for running along a route to a destination. When reaching a predetermined distance (may be determined in accordance with a type of event) before a place at which a recommended lane is changed, the action plan-generator 140 executes the passing through event, the lane-change event, the branching event, the merging event, or the like. During execution of each event, in a case in which there is a need to avoid an obstacle object, an avoidance locus is generated as illustrated in the drawing.

The other-vehicle cooperation controller 142 of the action plan-generator 140 performs cooperation control for causing the subject vehicle M and the oncoming vehicle OCV to cooperate with each other on the basis the state of the vehicle occupant of the oncoming vehicle OCV estimated by the other-vehicle occupant state-estimator 134. The cooperation control will be described later.

The stop position-searcher 144 of the action plan-generator 140, for example, in a case in which the width of the own lane is less than a predetermined width, searches for a position or a space at which the subject vehicle can evacuate to the side of the own lane and completely stop until the oncoming vehicle OCV passes (hereinafter, referred to as a stop space) under a situation in which the oncoming vehicle OCV is recognized. The stop space, for example, is a place at which a road width is larger than at least a sum of the vehicle widths of the subject vehicle M and the oncoming vehicle OCV. For example, the stop position-searcher 144 may search for a stop space on a map represented by the second map information 62 or search a stop space in a space in which objects are recognized by the recognizer 130 (a detection range of the camera 10, the radar device 12, and the finder 14).

The second controller 160 performs control of the running driving force output device 200, the brake device 210, and the steering device 220 such that the subject vehicle M passes along a target locus generated by the action plan-generator 140 at a scheduled time.

Referring back to FIG. 2, the second controller 160, for example, includes an acquirer 162, a speed controller 164, and a steering controller 166. The acquirer 162 acquires information of a target locus (locus points) generated by the action plan-generator 140 and stores the target locus information in a memory (not illustrated). The speed controller 164 controls the running driving force output device 200 or the brake device 210 on the basis of a speed element accompanying the target locus stored in the memory. The steering controller 166 controls the steering device 220 in accordance with a degree of curvature of the target locus stored in the memory. The processes of the speed controller 164 and the steering controller 166, for example, are realized by a combination of feed-forward control and feedback control. For example, the steering controller 166 may execute feed-forward control according to the curvature of a road in front of the subject vehicle M and feedback control based on a deviation from the target locus in combination.

The running driving force output device 200 outputs a running driving force (torque) used for a vehicle to drive the wheels. The running driving force output device 200, for example, includes a combination of an internal combustion engine, an electric motor, a transmission, and the like and an ECU controlling these components. The ECU controls the components described above in accordance with information input from the second controller 160 or information input from the driving operator 80. The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the second controller 160 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. In addition, the brake device 210 is not limited to the configuration described above and may be an electronically-controlled hydraulic brake device that delivers hydraulic pressure in the master cylinder to a cylinder by controlling an actuator in accordance with information input from the second controller 160.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the second controller 160 or information input from the driving operator 80.

[Process Flow]

Figure 5:
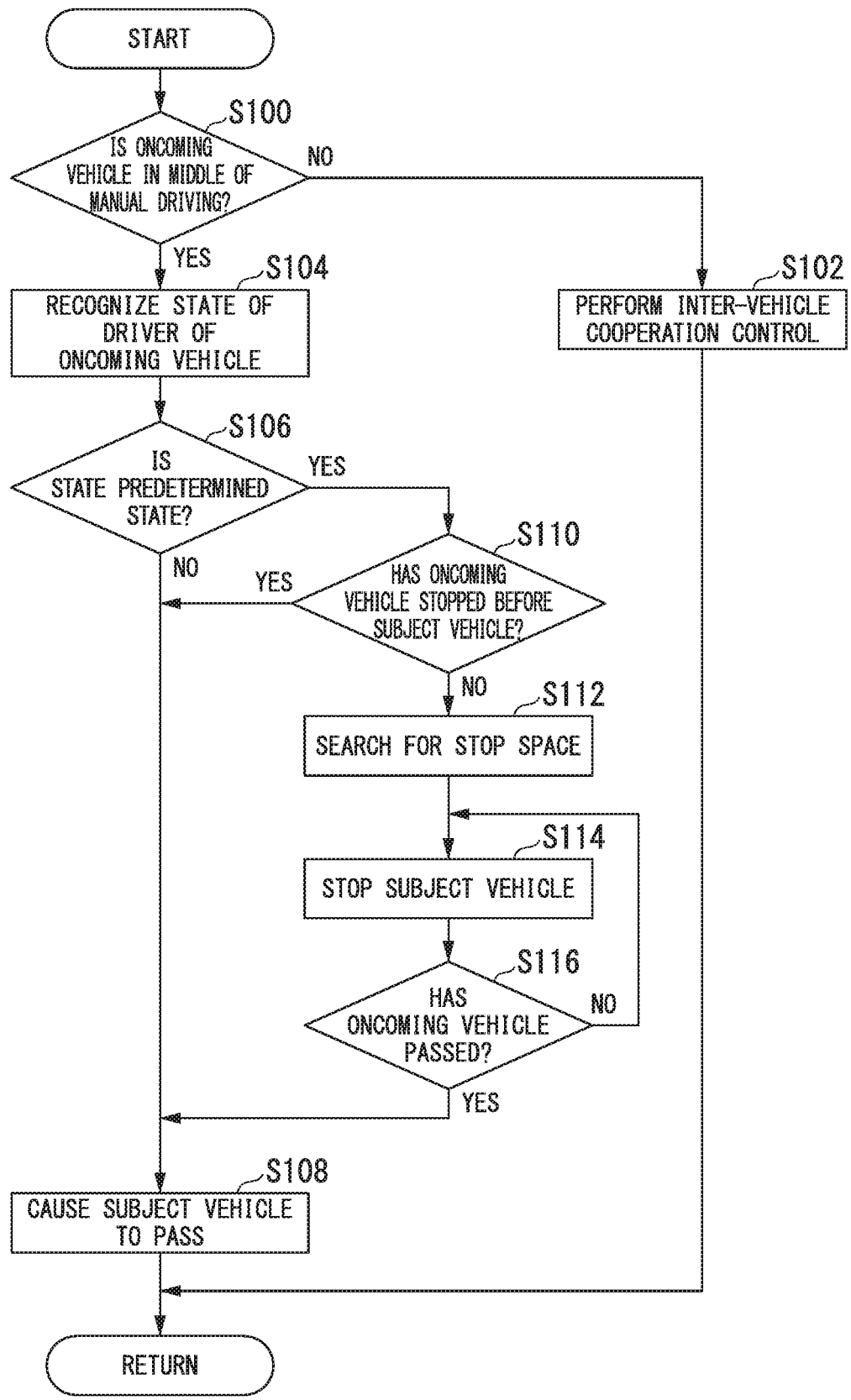
FIG. 5 is a flowchart showing one example of a process executed by an automated driving control device according to this embodiment.

FIG. 5 is a flowchart showing one example of a process executed by the automated driving control device 100 according to this embodiment. The process of this flowchart, for example, is executed in a case in which it is recognized by the narrow-road-recognizer 132 that there is an oncoming vehicle OCV, there is no center line on a road on which the subject vehicle M is running, and the width of the road is less than a predetermined width. In addition, the process of this flowchart, for example, may be executed repeatedly at predetermined intervals.

First, the manual driving vehicle-determiner 136 determines whether or not an oncoming vehicle OCV is running using manual driving (Step S100). For example, in a case in which inter-vehicle communication is established between the subject vehicle M and the oncoming vehicle OCV, the manual driving vehicle-determiner 136 determines that the vehicle system 1 or a system corresponding thereto is mounted in the oncoming vehicle OCV, and the oncoming vehicle OCV is autonomously running using automated driving. On the other hand, in a case in which inter-vehicle communication is not established between the subject vehicle M and the oncoming vehicle OCV, the manual driving vehicle-determiner 136 determines that the vehicle system 1 or a system corresponding thereto is not mounted in the oncoming vehicle OCV, and the oncoming vehicle OCV is running using manual driving.

In addition, even in a case in which the vehicle system 1 or a system corresponding thereto is mounted in the oncoming vehicle OCV, and the oncoming vehicle OCV is a vehicle that can be automatically driven, in a case in which inter-vehicle communication is not established between the subject vehicle M and the oncoming vehicle OCV, the manual driving vehicle-determiner 136 may determine that the oncoming vehicle OCV is running using manual driving. For example, even in a case in which the oncoming vehicle OCV is a vehicle that can execute automated driving, there are cases in which a vehicle occupant of the oncoming vehicle OCV executes manual driving. In such cases, it may be assumed that the vehicle occupant of the oncoming vehicle OCV performs setting such that some or all the functions of the inter-vehicle communication are stopped in order to suppress automatic execution of cooperation control to be described later. For this reason, in a case in which inter-vehicle communication is not established between the subject vehicle M and the oncoming vehicle OCV regardless of a type of the oncoming vehicle OCV (a vehicle capable of executing automated driving or manual driving vehicle), the manual driving vehicle-determiner 136 may determine that the oncoming vehicle OCV is running using manual driving.

In addition, the manual driving vehicle-determiner 136 may determine that the oncoming vehicle OCV is running using manual driving in a case in which a predetermined lamp (a lamp representing that manual driving is executing) of the oncoming vehicle OCV is turned on and determine that the oncoming vehicle OCV is running using automated driving in a case in which the predetermined lamp is not turned on.

In addition, the manual driving vehicle-determiner 136 may determine that the oncoming vehicle OCV is running using automated driving in a case in which reflected waves of radiowaves emitted by the radar device 12 interfere with other radiowaves or reflected waves of laser light emitted by the finder 14 interfere with other laser light and determine that the oncoming vehicle OCV is running using manual driving otherwise. For example, in a case in which the oncoming vehicle OCV is a vehicle capable of executing automated driving, it is assumed that, similar to the subject vehicle M, radar devices and finders are mounted in the oncoming vehicle OCV and sense the surrounding status during running. In such a case, there are cases in which radiowaves emitted from a radar device mounted in the oncoming vehicle OCV and laser light emitted from a finder interfere with radiowaves and laser light emitted from the subject vehicle M side. Accordingly, the manual driving vehicle-determiner 136 may determine that the oncoming vehicle OCV is running using manual driving or running using automated driving in accordance with the presence/absence of interference between such radiowaves and laser light.

In a case in which it is determined by the manual driving vehicle-determiner 136 that the oncoming vehicle OCV is running using automated driving, the other-vehicle cooperation controller 142 executes cooperation control (Step S102). For example, the other-vehicle cooperation controller 142 outputs an instruction to the communication device 20 and causes the communication device 20 to execute inter-vehicle communication with the oncoming vehicle OCV. When the inter-vehicle communication with the oncoming vehicle OCV is established, the other-vehicle cooperation controller 142 determines which one of the subject vehicle M and the oncoming vehicle OCV is allowed to move forward first and transmits a result of the determination to the oncoming vehicle OCV. By each vehicle executing automated driving in accordance with the result of the determination, for example, operations cooperating with each other such as the subject vehicle M moving forward, and the oncoming vehicle OCV moving backward are realized.

On the other hand, in a case it is determined by the manual driving vehicle-determiner 136 that the oncoming vehicle OCV is running using manual driving, the other-vehicle occupant state-estimator 134 estimates, on the basis of a facial expression, an action, a posture, and the like of a driver of the oncoming vehicle OCV, a state of the driver (Step S104).

Figure 6:
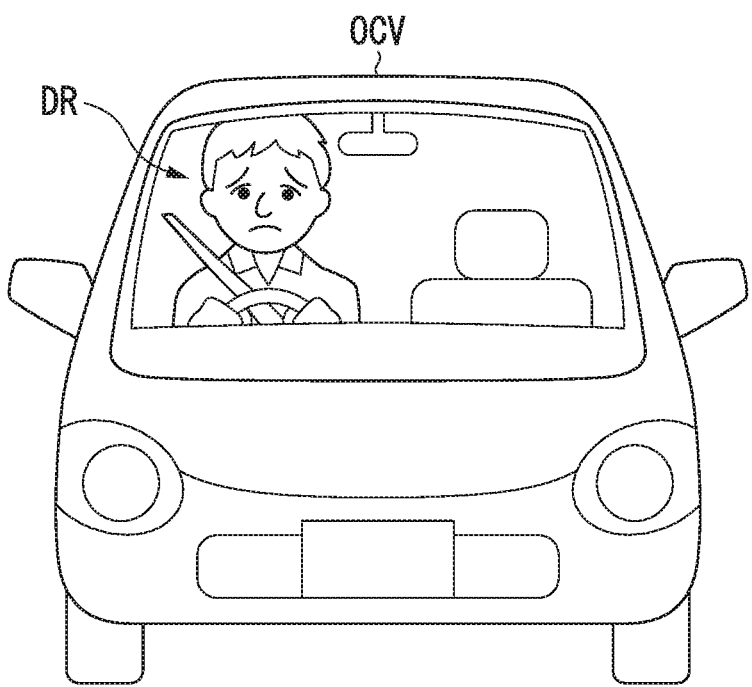
FIG. 6 is a diagram showing one example of a view in which a state of a driver of an oncoming vehicle is estimated.

FIG. 6 is a diagram showing one example of a view in which a state of a driver of an oncoming vehicle OCV is estimated. For example, the other-vehicle occupant state-estimator 134 estimates a feeling of a driver on the basis of a facial image of the driver captured by the camera 10 over a window of the oncoming vehicle OCV using an application (hereinafter, referred to as a feeling analysis application) analyzing a feeling or sentiment of a person included in an image using artificial intelligence (machine learning) or the like.

Figure 7:
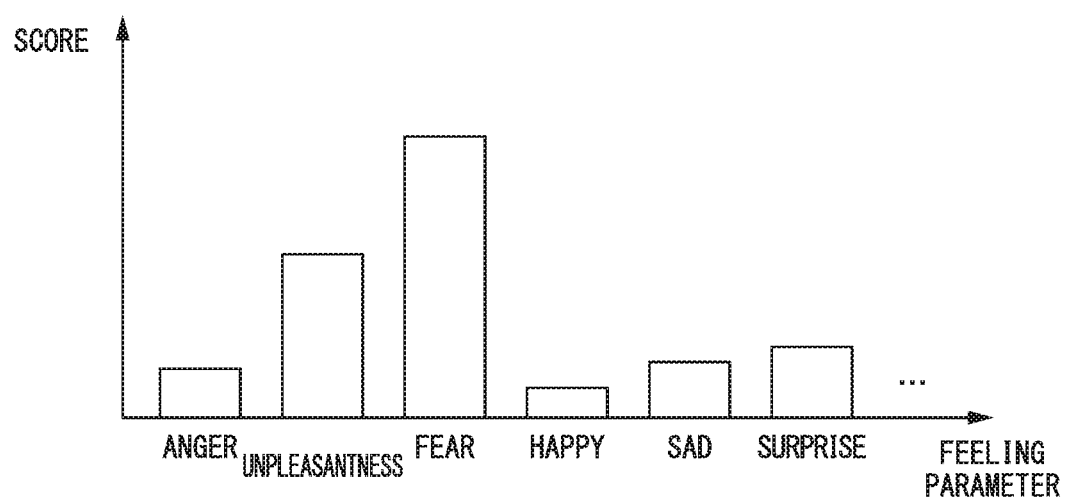
FIG. 7 is a diagram showing one example of feelings of the driver estimated in the view showed in FIG. 6.

FIG. 7 is a diagram showing one example of feelings of the driver estimated in the view showed in FIG. 6. For example, the other-vehicle occupant state-estimator 134 estimates the feeling of the driver by statistically evaluating a score derived for each of parameters of various feelings such as anger, unpleasantness, fear, happiness, sadness, and surprise using the feeling analysis application. In the example illustrated in the drawing, since the scores of the parameters of unpleasantness and fear are high, the other-vehicle occupant state-estimator 134 estimates that the driver of the oncoming vehicle OCV illustrated in FIG. 6 has no confidence in driving (not good at driving).

In addition, the other-vehicle occupant state-estimator 134 may estimate the state on the basis of a motion of a body of the driver of the oncoming vehicle OCV. For example, in a case in which an upper body of the driver of the oncoming of the oncoming vehicle OCV is unsteady, or the driver looks around in an unsteady appearance while horizontally shaking his or her head, it may be estimated that the driver has no confidence in driving.

In addition, in a case in which a driver monitor camera capturing a driver's face is mounted in the oncoming vehicle OCV, the other-vehicle occupant state-estimator 134 may estimate the feeling of the driver of the oncoming vehicle OCV using the feeling analysis application on the basis of an image captured by this driver monitor camera.

In addition, in a case in which a seat sensor (a pressure sensitive sensor) is disposed in a driver seat of the oncoming vehicle OCV, the other-vehicle occupant state-estimator 134 may estimate the feeling of the driver of the oncoming vehicle OCV on the basis of a detection value acquired by this sensor. For example, in a case in which a blood pressure and the like of the driver are detected by the seat sensor, in a case in which the blood pressure of the driver of the oncoming vehicle OCV rises sharply when the subject vehicle M and the oncoming vehicle OCV face each other, the other-vehicle occupant state-estimator 134 may estimate that the driver of the oncoming vehicle OCV is nervous and has no confidence in driving.

In addition, in a case in which a specific mark such as a novice driver mark is attached to the oncoming vehicle OCV, the other-vehicle occupant state-estimator 134 may estimate that the driver of the oncoming vehicle OCV has no confidence in driving. Next, the action plan-generator 140 determines whether or not the state of the driver of the oncoming vehicle OCV estimated by the other-vehicle occupant state-estimator 134 is a predetermined state (Step S106). Here, the predetermined state, for example, is a state in which it is represented in a facial expression, an action, and the like of the driver that the driver has no confidence in driving. In the example illustrated in FIG. 6 described above, since it is estimated that the driver of the oncoming vehicle OCV has no confidence in driving, the action plan-generator 140 determines that the state of the driver of the oncoming vehicle OCV is the predetermined state.

In a case in which it is determined that the state of the driver of the oncoming vehicle OCV is not the predetermined state, the action plan-generator 140 regards that the oncoming vehicle OCV yields the way and generates a target locus for causing the subject vehicle M to pass through a place having no width corresponding to two vehicles (Step S108). For example, the action plan-generator 140 generates a target locus including a target speed for maintaining the current vehicle speed or decelerating to a degree for slow moving as a speed element. Accordingly, the speed controller 164 and the steering controller 166 control the acceleration/deceleration and steering of the subject vehicle M along the target locus, whereby the subject vehicle M runs straight.

On the other hand, in a case in which it is determined that the state of the driver of the oncoming vehicle OCV is the predetermined state, the action plan-generator 140 determines whether or not the oncoming vehicle OCV has stopped before the subject vehicle M (Step S110). In a case in which it is determined that the oncoming vehicle OCV has stopped before the subject vehicle M, the action plan-generator 140 causes the process to proceed to S108.

Figure 8:
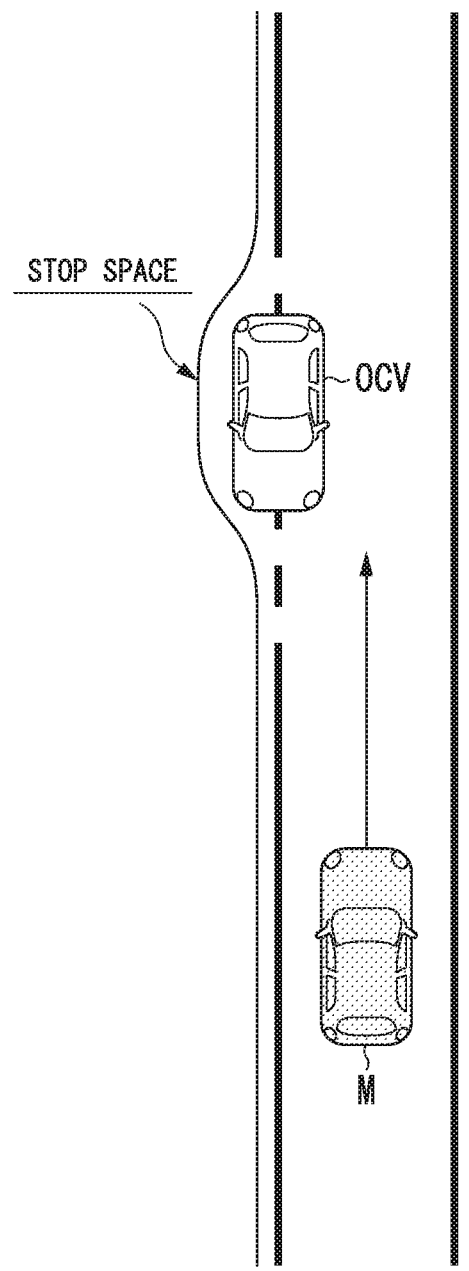
FIG. 8 is a diagram showing one example of a view in which an oncoming vehicle stops before a subject vehicle M.

FIG. 8 is a diagram showing one example of a view in which an oncoming vehicle OCV stops before a subject vehicle M. In the example illustrated in the drawing, the oncoming vehicle OCV has stopped at a stop space first. In such a case, the action plan-generator 140 may generate a target locus for causing the subject vehicle M to move straight. In this way, the subject vehicle M passes the side of the oncoming vehicle OCV.

On the other hand, in a case in which it is determined that the oncoming vehicle OCV has not stopped before the subject vehicle M, in other words, in a case in which both the subject vehicle M and the oncoming vehicle OCV are running, the stop position-searcher 144 searches for a stop space (Step S112).

In a case in which it is determined that there is a stop space as a result of the search executed by the stop position-searcher 144, the action plan-generator 140 generates a target locus for causing the subject vehicle M to move to the stop space and causing the subject vehicle M to completely stop at the space. (Step S114).

Figure 9:
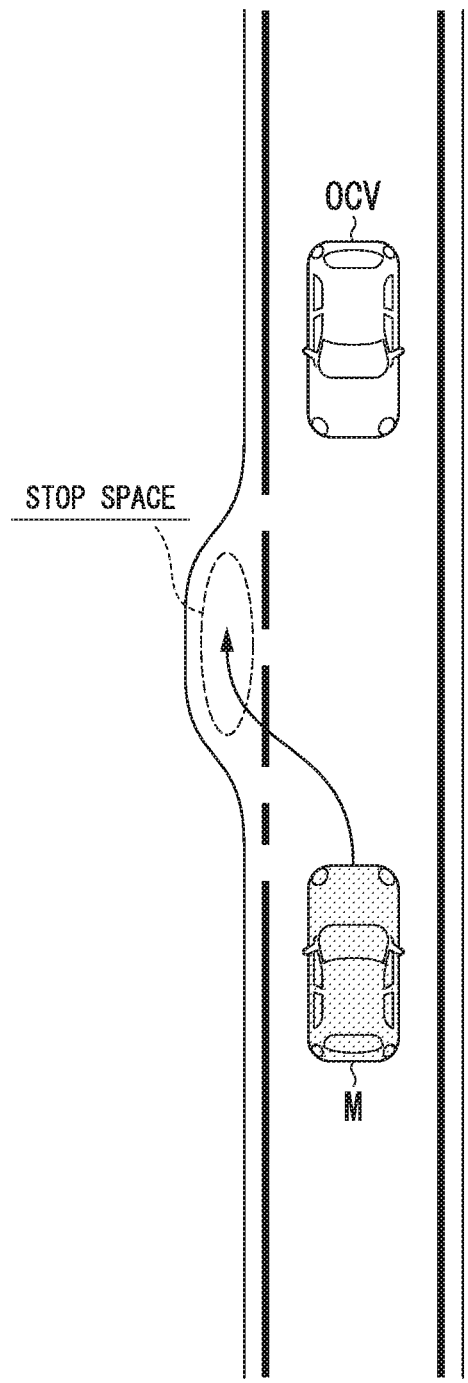
FIG. 9 is a diagram showing one example of a view in which the subject vehicle M is caused to move to a stop space.

FIG. 9 is a diagram showing one example of a view in which the subject vehicle M is caused to move to a stop space. In the example illustrated in the drawing, there is a stop space in front of the subject vehicle M, and accordingly, the action plan-generator 140 generates a target locus for causing the subject vehicle M to move to the stop space on the road side while causing the subject vehicle M to move forward. At this time, the action plan-generator 140 may determine a target speed included as a speed element of the target locus to be equal to or lower than a predetermined speed. Here, the predetermined speed is a speed of a degree that may be regarded as the subject vehicle M being stopped and, for example, is a speed of 0 [km/h] or several [km/h]. In this way, the subject vehicle M can be caused to move to the stop space while decelerating the subject vehicle. In a case in which the subject vehicle M arrives at the stop space, the action plan-generator 140 generates a target locus including a target speed for which the speed of the subject vehicle M is maintained to be equal to or lower than a predetermined speed as a speed element. Accordingly, the subject vehicle M continues to stop at the stop space.

Figure 10:
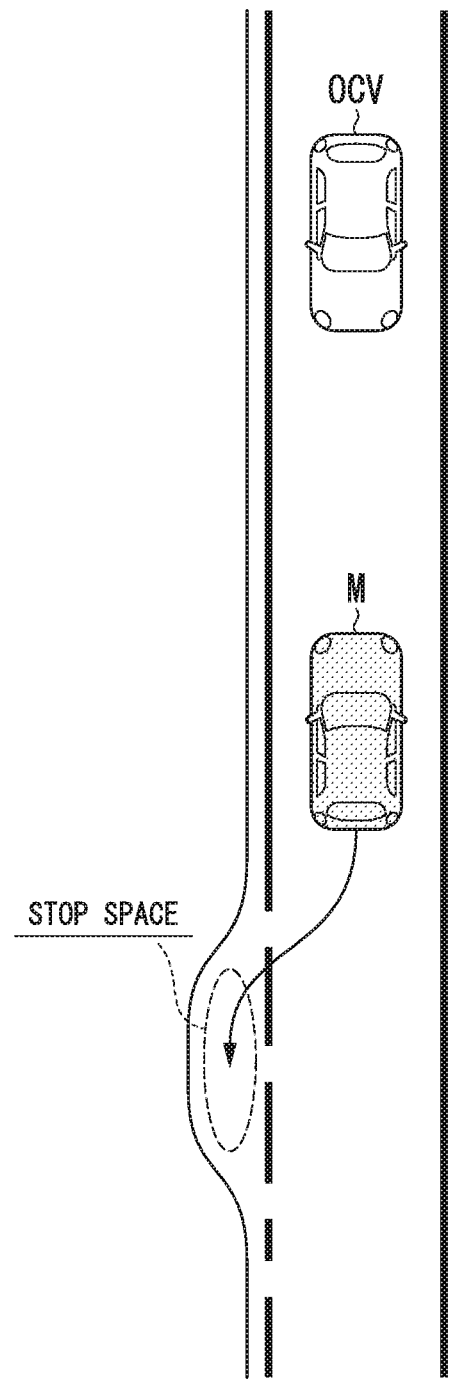
FIG. 10 is a diagram showing another example of a view in which the subject vehicle M is caused to move to a stop space.

FIG. 10 is a diagram showing another example of a view in which the subject vehicle M is caused to move to a stop space. In the example illustrated in the drawing, there is a stop space in rear of the subject vehicle M, and accordingly, the action plan-generator 140 generates a target locus for causing the subject vehicle M to move to the stop space on the road side while causing the subject vehicle M to move backward. In this way, the subject vehicle M can be caused to move to the stop space and wait at the space until the oncoming vehicle OCV passes. In this way, in a case in which a driver of the oncoming vehicle OCV that is manually driven is in a predetermined state, the subject vehicle M that is a vehicle capable of executing automated driving operates to avoid the oncoming vehicle OCV with priority, and accordingly, the driving load of the driver of the oncoming vehicle OCV can be decreased, and the oncoming vehicle OCV can be considered more.

Next, after causing the subject vehicle M to move to the stop space, the action plan-generator 140 determines whether or not the oncoming vehicle OCV has passed the lateral side of the stop space (Step S116). In a case in which it is determined that the oncoming vehicle OCV has not passed the lateral side of the stop space, the action plan-generator 140 generates a target locus for causing the subject vehicle M to continue to sop at the stop space.

On the other hand, in a case in which it is determined that the oncoming vehicle OCV has passed the lateral side of the stop space, the action plan-generator 140 generates a target locus for causing the subject vehicle M to return from the stop space to a lane and pass a place having no width corresponding to two vehicles as the process of S108. In this way, the process of this flowchart ends.

In the process of the flowchart described above, although the process of S104 has been described as being performed in a case in which it is determined by the manual driving vehicle-determiner 136 that the oncoming vehicle OCV is running using manual driving, the process is not limited thereto. For example, separately from the series of processes of this flowchart, the process of S104 may be repeatedly performed at predetermined intervals in a case in which there is an oncoming vehicle OCV.

In addition, in a case in which there is no stop space in the process of searching for a stop space in S112, the automated driving control device 100 may switch the driving mode of the subject vehicle M from automated driving to manual driving after notifying the vehicle occupant of the subject vehicle M thereof in advance.

According to the embodiment described above, one or more other vehicles m present in the vicinity of the subject vehicle M are recognized, it is recognized whether a road on which the subject vehicle M is running is a narrow road, a state of a driver of the oncoming vehicle OCV facing the subject vehicle M among the one or more other vehicles m that have been recognized is estimated, and it is determined whether or not the oncoming vehicle is a vehicle executing manual driving. In a case in which it is determined that the oncoming vehicle is a vehicle executing manual driving, and it is recognized that the road on which the subject vehicle M is running is a narrow road, the subject vehicle M is decelerated to a speed that is equal to or lower than a predetermined speed on the basis of the estimated state of the driver of the oncoming vehicle. Accordingly, when the subject vehicle passes the oncoming vehicle OCV, the vehicle occupants of the oncoming vehicle OCV and the subject vehicle M are suppressed from feeling fear and unpleasantness. As a result, vehicle control in consideration of the oncoming vehicle OCV can be performed.

<Hardware Configuration>

Figure 11:
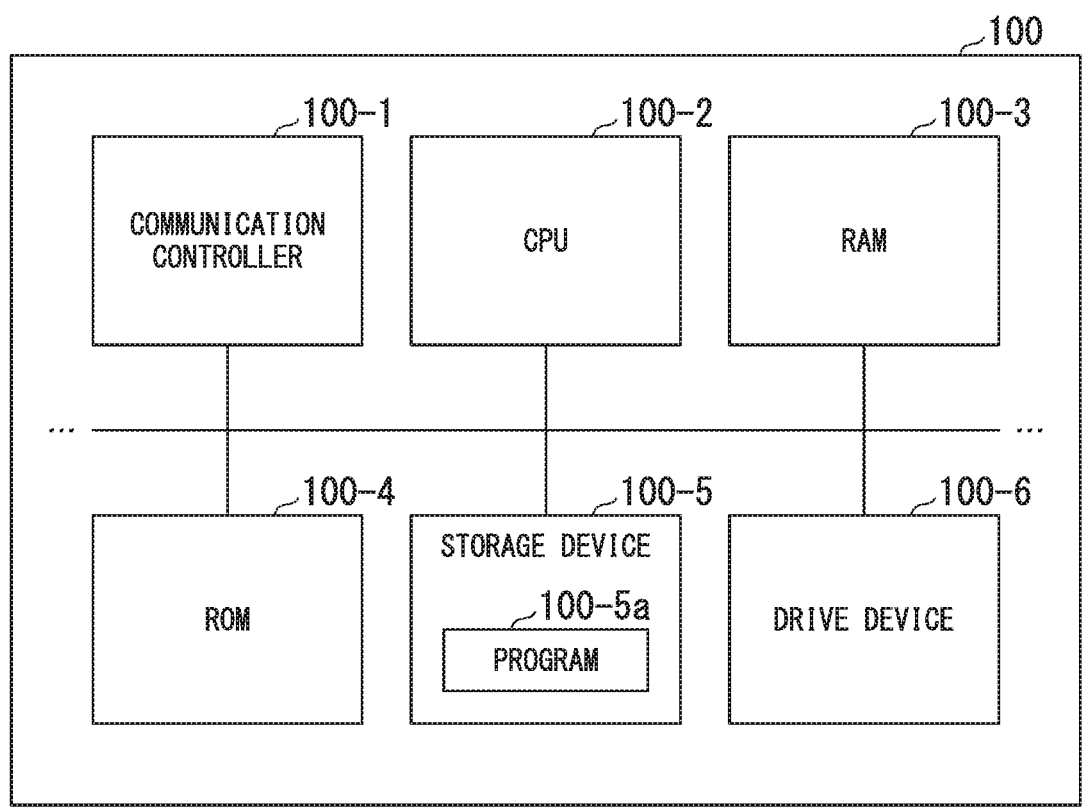
FIG. 11 is a diagram showing one example of the hardware configuration of an automated driving control device according to an embodiment.

The automated driving control device 100 according to the embodiment described above, for example, is realized by a hardware configuration as illustrated in FIG. 11. FIG. 11 is a diagram showing one example of the hardware configuration the automated driving control device 100 according to an embodiment.

The automated driving control device 100 has a configuration in which a communication controller 100-1, a CPU 100-2, a random-access memory (RAM) 100-3, a read-only memory (ROM) 100-4, a secondary storage device 100-5 such as a flash memory or an HDD, and a drive device 100-6 are interconnected through an internal bus or a dedicated communication line. A portable storage medium such as an optical disc is loaded into the drive device 100-6. A program 100-5*a* stored in the secondary storage device 100-5 is expanded into the RAM 100-3 by a DMA controller (not illustrated in the drawing) or the like and is executed by the CPU 100-2, whereby the first controller 120 and the second controller 160 are realized. In addition, the program referred to by the CPU 100-2 may be stored in the portable storage medium loaded into the drive device 100-6 or may be downloaded from another device through a network.

The embodiment described above can be represented as below.

A vehicle control device including a storage storing a program and a processor, the processor, by executing the program configured to execute: recognizing one or more other vehicles present in the vicinity of a subject vehicle; recognizing that a road on which the subject vehicle is running is a road having no center line; estimating a state of a driver of an oncoming vehicle facing the subject vehicle among the recognized one or more other vehicles; determining whether the recognized oncoming vehicle is a vehicle executing manual driving; and decelerating the subject vehicle to a speed equal to or lower than a predetermined speed on the basis of the estimated state of the driver of the oncoming vehicle in a case in which the oncoming vehicle is determined to be a vehicle executing manual driving, and the road on which the subject vehicle is running is recognized as a road having no center line.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims. For example, the vehicle system 1 according to the embodiment described above may be applied to a system performing driving support such as the ACC or the LKAS.

What is claimed is:

1. A vehicle control device, comprising:
a processor; and
a memory that stores instructions that, when executed by the processor, facilitates performance of operations, comprising:
recognizing one or more other vehicles present in a vicinity of a subject vehicle;
recognizing that a road on which the subject vehicle is running is a road having no center line;
estimating a state of a driver of an oncoming vehicle facing the subject vehicle among the one or more other vehicles;
determining whether the oncoming vehicle is a vehicle executing manual driving;
decelerating the subject vehicle to a speed equal to or less than a predetermined speed based on the state of the driver of the oncoming vehicle in a case in which the oncoming vehicle is determined to be the vehicle executing manual driving, and the road on which the subject vehicle is running is the road having no center line; and
maintaining a state in which the subject vehicle is decelerating to the speed equal to or less than the predetermined speed at a place at which a width of the road is greater than at least a sum of a first vehicle width of the subject vehicle and a second vehicle width of the oncoming vehicle,
wherein the operations further comprise: communicating with the other vehicles,
wherein the communicating comprises: communicating with the oncoming vehicle in a case in which the subject vehicle passes the oncoming vehicle without change on the road having no center line,
determining whether or not the oncoming vehicle is the vehicle executing manual driving based on at least a result of a communication with the oncoming vehicle, and
determining that the oncoming vehicle is the vehicle executing manual driving in a case that the subject vehicle in a case in which the communication is not established between the subject vehicle and the oncoming vehicle,
wherein the vehicle control device further comprise a radar device and a finder,
wherein the operations further comprise: determining that the oncoming vehicle is the vehicle executing manual driving in a case in which reflected waves of radio waves emitted by the radar device non-interfere with other radio waves or reflected waves of laser light emitted by the finder non-interfere with other laser light.

2. The vehicle control device according to claim 1, wherein the speed is a first speed, and wherein the operations further comprise:
recognizing a second speed of the oncoming vehicle, and
not decelerating the subject vehicle to the first speed that is equal to or less than the predetermined speed in a case in which the oncoming vehicle is determined to be the vehicle executing manual driving, and the second speed of the oncoming vehicle is equal to or less than the predetermined speed.

3. A vehicle control method causing an in-vehicle computer comprising a processor to execute:
recognizing one or more other vehicles present in a vicinity of a subject vehicle;
recognizing that a road on which the subject vehicle is running is a road having no center line;
estimating a state of a driver of an oncoming vehicle facing the subject vehicle among the one or more other vehicles;
determining whether the oncoming vehicle is a vehicle executing manual driving;
decelerating the subject vehicle to a speed equal to or less than a predetermined speed based on the state of the driver of the oncoming vehicle in a case in which the oncoming vehicle is the vehicle executing manual driving, and the road on which the subject vehicle is running is the road having no center line; and maintaining a state in which the subject vehicle is decelerating to the speed equal to or less than the predetermined speed at a place at which a width of the road is greater than at least a sum of a first vehicle width of the subject vehicle and a second vehicle width of the oncoming vehicle, wherein the method further comprises: communicating with the other vehicles, wherein the communicating further comprises: communicating with the oncoming vehicle in a case in which the subject vehicle passes the oncoming vehicle without change on the road having no center line, determining whether or not the oncoming vehicle is the vehicle executing manual driving based on at least a result of a communication with the oncoming vehicle, and determining that the oncoming vehicle is the vehicle executing manual driving in a case that the subject vehicle in a case in which the communication is not established between the subject vehicle and the oncoming vehicle, wherein the method further comprises: determining that the oncoming vehicle is the vehicle executing manual driving in a case in which reflected waves of radio waves emitted by a radar device non-interfere with other radio waves or reflected waves of laser light emitted by a finder non-interfere with other laser light, the radar device and the finder being mounted in the subject vehicle.

4. A computer-readable non-transitory storage medium having a program stored thereon, the program causing an in-vehicle computer to execute:

a process of recognizing one or more other vehicles present in a vicinity of a subject vehicle;

a process of recognizing that a road on which the subject vehicle is running is a road having no center line;

a process of estimating a state of a driver of an oncoming vehicle facing the subject vehicle among the one or more other vehicles;

a process of determining whether the oncoming vehicle is a vehicle executing manual driving;

a process of decelerating the subject vehicle to a speed equal to or less than a predetermined speed based on the of the driver of the oncoming vehicle in a case in which the oncoming vehicle is the vehicle executing manual driving, and the road on which the subject vehicle is running is the road having no center line; and a process of maintaining a state in which the subject vehicle is decelerating to the speed equal to or less than the predetermined speed at a place at which a width of the road is greater than at least a sum of a first vehicle width of the subject vehicle and a second vehicle width of the oncoming vehicle, wherein the in-vehicle computer further executes: communicating with the other vehicles, wherein the communicating comprises: communicating with the oncoming vehicle in a case in which the subject vehicle passes the oncoming vehicle without change on the road having no center line, determining whether or not the oncoming vehicle is the vehicle executing manual driving based on at least a result of a communication with the oncoming vehicle, and determining that the oncoming vehicle is the vehicle executing manual driving in a case that the subject vehicle in a case in which the communication is not established between the subject vehicle and the oncoming vehicle, wherein the in-vehicle computer further executes: determining that the oncoming vehicle is the vehicle executing manual driving in a case in which reflected waves of radio waves emitted by a radar device non-interfere with other radio waves or reflected waves of laser light emitted by a finder non-interfere with other laser light, the radar device and the finder being mounted in the subject vehicle.

* * * * *